United States Patent [19]

Cole, Jr. et al.

[11] 4,128,496
[45] Dec. 5, 1978

[54] DICHROIC LIQUID CRYSTAL COMPOSITIONS

[75] Inventors: Herbert S. Cole, Jr., Scotia; Siegfried Aftergut, Schenectady, both of N.Y.

[73] Assignee: General Electric Company, Schenectady, N.Y.

[21] Appl. No.: 835,044

[22] Filed: Sep. 21, 1977

Related U.S. Application Data

[63] Continuation-in-part of Ser. No. 721,670, Sep. 9, 1976, abandoned.

[51] Int. Cl.$^2$ ............................ C09K 3/34; G02F 1/13
[52] U.S. Cl. .................................... 252/299; 252/408; 260/205; 260/566 R; 260/566 F; 350/349; 350/350
[58] Field of Search .............................. 252/299, 408; 350/160 LC, 349, 350

[56] References Cited

U.S. PATENT DOCUMENTS

| | | | |
|---|---|---|---|
| 3,597,044 | 8/1971 | Castellano | 252/299 |
| 3,703,329 | 11/1972 | Castellano | 252/299 |
| 3,833,287 | 9/1974 | Taylor et al. | 252/299 |
| 3,876,286 | 4/1975 | Deutscher et al. | 252/299 |
| 3,915,883 | 10/1975 | Van Meter et al. | 252/299 |
| 3,953,491 | 4/1976 | Steinstrasser et al. | 252/299 |
| 3,960,750 | 6/1976 | Moriyama et al. | 252/299 |
| 3,960,751 | 6/1976 | Moriyama et al. | 252/299 |
| 4,002,670 | 1/1977 | Steinstrasser | 252/299 |
| 4,032,219 | 6/1977 | Constant et al. | 252/299 |
| 4,032,470 | 6/1977 | Bloom et al. | 252/299 |

FOREIGN PATENT DOCUMENTS

2627215 1/1977 Fed. Rep. of Germany ........... 252/299
1459046 12/1976 United Kingdom ...................... 252/299

OTHER PUBLICATIONS

White, D. L., et al., J. Appl. Phys., vol. 45, No. 11, pp. 4718-4723 (1974).
Bloom, A., et al., Mol. Cryst. Liq. Cryst., vol. 40, pp. 213-221, (1977).
Bloom, A., et al., Mol. Cryst. Liq. Cryst., vol. 41, pp. 1-4 (1977).
Kast, Landolt-Bornstein, Band II, Teil 2a, 6th Ed., Springer—Verlag, Berlin, pp. 266-267, 323-325, 335 (1960).
Uchida, T., et al., Mol. Cryst. Liq. Cryst., vol. 39, pp. 39-52, (1977).

*Primary Examiner*—Benjamin R. Padgett
*Assistant Examiner*—T. S. Gron
*Attorney, Agent, or Firm*—Geoffrey H. Krauss; Joseph T. Cohen; Marvin Snyder

[57] ABSTRACT

Dichroic liquid crystal compositions, for use in liquid crystal displays, have a host liquid crystal material in which is dissolved one of a plurality of guest dichroic dyes, each having at least one Schiff-base

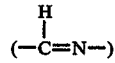

bonding group. The dichroic liquid crystal compositions have a high order parameter, for providing contrast ratios on the order of 10:1 and imparting a yellow color to the display.

6 Claims, No Drawings

DICHROIC LIQUID CRYSTAL COMPOSITIONS

BACKGROUND OF THE INVENTION

The present application is a continuation-in-part of U.S. patent application Ser. No. 721,670, filed Sept. 9, 1976, now abandoned.

The present invention relates to liquid crystal displays and, more particularly, to novel dichroic liquid crystal compositions of a liquid crystal material hosting one of a plurality of guest dichroic dyes each having at least one Schiff-base bonding group; the dichroic liquid crystal compositions have a high order parameter and provide contrast ratios on the order of 10:1 and a yellow color.

A display, particularly one of the liquid crystal type, can be characterized by brightness and contrast performance criteria. It is known to improve these performance criteria by dissolving a guest dichroic dye in a host liquid crystal material. Many such dyes have been especially developed for a variety of applications such as dyeing of fabrics, printing of textiles, coloring of plastics, color image formation in photography, etc. To provide the requisite properties, such as hue, solubility, affinity for the substrate, chemical resistance, and compatibility with the medium from which the dye is applied, the molecular structure of the dye is specially designed for each application. Important properties required for the present application in liquid crystal displays, include the following: dichroism, solubility and high order parameter.

Dichroism is the property whereby an oriented assembly of dye molecules exhibit relatively low absorption of a given wavelength of light in one state of orientation and a relatively high absorption of the same wavelength in another state of orientation with respect to the light source. The orientation can be brought about by dissolution of the dye in a liquid crystal solvent or by embedding the dye in a stretched plastic.

Solubility must be sufficiently high so that thin layers, for example, of ten micrometers, have adequate light absorption in one of the oriented states. Ionic dyes will generally be inadequate not only because of their low solubility but also because they increase the electrical conductivity of liquid crystals.

Order parameter is a quantitative measure of the degree of molecular order or alignment in a given system. High order parameter is promoted by dyes with elongated shape having a large ratio of molecular length to breadth, similar to the shape of the molecules of liquid crystal host material. To ensure an elongated shape, the molecules should have a rigid structure which can be obtained, for example, by linking benzene or heterocyclic rings with double bonded groups. The brightness and contrast are both related to the order parameter S of the dye, where $S = (R-1)/R+2)$ and R is the ratio of light absorption in the dye measured with a polarizer respectively parallel and perpendicular to the nematic director of the liquid crystal host at the wavelength of maximum absorption. Advantageously, the order parameter should be at least 0.65, and preferably as high as possible, to achieve a minimum desired contrast ratio on the order of 10:1, while still allowing a liquid crystal guest-host display to be fabricated with a reasonable brightness parameter.

BRIEF SUMMARY OF THE INVENTION

In accordance with the invention, dichroic liquid crystal compositions having a yellow color and an order parameter S of at least 0.70, each comprise a host nematic liquid crystal material in which is dissolved a guest dichroic dye having a relatively elongated and rigid molecule with at least one Schiff-base

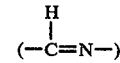

bonding group linking cyclic substituents and having chromophoric end groups (auxochromes), e.g., electron-withdrawing groups or electron-repelling groups, imparting a characteristic yellow color thereto by absorption over a specific portion of the visible light spectrum in the region between about 410 and 450 nanometers (nm.).

Several preferred dichroic liquid crystal compositions have dissolved therein the dichroic dyes: 4,4'-bis(4-dimethyl-aminobenzalamino)azobenzene, yielding a composition with an order parameter of about 0.77 and a maximum absorption wavelength of about 425 nanometers (nm.); 4,4'-bis(4-nitrobenzalamino)azobenzene, yielding a composition with an order parameter of about 0.75 and a maximum absorption wavelength of about 415 nm.; 4,4'-bis(1-naphthylamino)azobenzene, yielding a composition with an order parameter of about 0.75 and a maximum absorption wavelength of about 410 nm; 4-(4-dimethyl-aminophenylazo)-4'-dimethylaminobenzalaniline, yielding a composition with an order parameter of about 0.71 and a maximum absorption wavelength of about 415 nm.; and 4-[2-(4-dimethylaminophenyl)vinyl]-4'-nitrobenzalaniline, yielding a composition with an order parameter of about 0.71 and a maximum absorption wavelength of about 450 nm.

Accordingly, it is an object of the present invention to provide novel yellow dichroic liquid crystal compositions having dichroic dyes at least one Schiff-base bonding group and with the compositions each having an order parameter in excess of 0.70.

This and other objects of the invention will become apparent from a consideration of the following detailed description.

DETAILED DESCRIPTION OF THE INVENTION

Liquid crystal displays of the host liquid crystal-guest dichroic dye type require a dichroic liquid crystal mixture having as high a value of order parameter S as possible, to obtain high contrast ratios. Towards this end, we have synthesized several yellow dichroic liquid crystal compositions each characterized by an order parameter S greater than 0.70 and by a maximum absorption wavelength in the range from about 410 nm. to about 450 nm. The compositions each comprise a liquid crystal material, preferably of the positive dielectric anisotropy type, having dissolved therein at least one of a plurality of guest dichroic dyes each having at least one Schiff-base

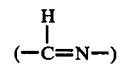

bonding group, whereby a dichroic dye guest-liquid crystal host display cell generally having an observable color in the blue portion of the visible spectrum is provided with contrast ratios (i.e., the ratio of the light observable in the brighter condition to the light observable in the darker condition) on the order of 10:1.

The Schiff-base dyes may be characterized as belonging to one of two series. The first series is generically named 4,4'-bis(benzalamino)azobenzene, having a chemical formula

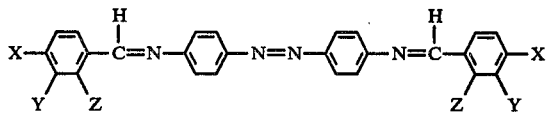

where X may be selected from hydrogen, a nitro (—$NO_2$) radical and a dimethylamino($N[CH_3]_2$) radical; and Y and Z may be selected to be either hydrogen or the bonds to adjacent carbon sites in a fused benzo ring. Thus, a first preferred yellow dichroic liquid crystal composition has dissolved therein the dichroic dye 4,4'-bis(4-dimethylaminobenzalamino)azobenzene, having the chemical formula

DYE 1

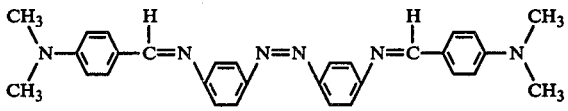

wherein X is the dimethylamino radical and Y and Z are hydrogen.

This dichroic dye, typical of the series, is synthesized by dissolving 0.10 M (2.2 grams) of azodianiline and 0.2 M (2.98 grams) of p-dimethylaminobenzaldehyde in 300 cc. of benzene and refluxing at 80° C. on a steam bath for two hours. The reaction mixture is filtered hot and the product allowed to precipitate out as a reddish powder.

The high order parameter values of the novel dichroic liquid crystal compositions are measured by dissolving approximately 0.5% by weight of one of the preferred dichroic dyes disclosed herein in a host nematic liquid crystal material. One host is a mixture of 70% by weight of p-pentylphenyl-2-chloro-4-(p-pentylbenzoyloxy)benzoate (available from Eastman Organic Chemicals as their compound EK-11650) and 30% by weight of a mixture of esters available from E. M. Merck and Co., as their compound ZLI-389, and apparently composed of approximately 50–60% by weight of 4'-n-pentylphenyl ester of anisic acid, 25–35% by weight of 4'-n-pentylphenyl ester of 4-hexyloxybenzoic acid, and 10–15% by weight of (2-cyano-4'-butylphenyl) ester of 4-(hexanoyloxybenzoyloxy)-benzoic acid. The nematic mixture of this formulation possesses a large mesophase range with the nematic-to-isotropic transition temperature occurring at about 100° C. A test cell was constructed utilizing indium-oxide-coated glass substrates having surfaces coated with obliquely evaporated silicon oxide orientation layers, utilizing an incidence angle of 60° with respect to the substrate surface normal. The orientation layers provide unidirectional alignment of the molecules of the liquid crystal material and, generally, of the dichroic dye, parallel to the substrate planes. A 25 micron thick layer of the liquid crystal host-guest dye mixture is sealed between the substrates and order parameter is calculated from the measurement of light absorption with a polarizer respectively parallel and perpendicular to the nematic director of the liquid crystal material. The order parameter of the dichroic liquid crystal composition formed with dye 1 is found to be on the order of 0.77, while the maximum absorption wavelength is found to be approximately 425 nm., which composition imparts a generally yellow color to the liquid crystal display.

Similar synthesis yields a second preferred yellow dichroic dye 4,4'-bis(4-nitrobenzalamino)azobenzene, having a chemical formula

DYE 2

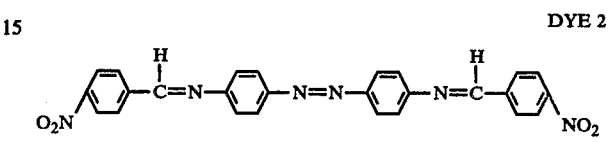

and the dichroic liquid crystal composition formed by dissolving this dye in the liquid crystal host has an order parameter S of about 0.75 and a maximum absorption wavelength of about 415 nm. A third preferred yellow dichroic dye of this first series is 4,4'-bis(1-naphthylamino)azobenzene, having a chemical formula

DYE 3

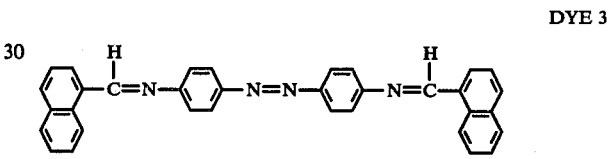

with the dichroic liquid crystal composition having dye 3 as guest dye therein having an order parameter of about 0.75 and a maximum absorption wavelength peaking at about 410 nm.

The second series of yellow dichroic dyes are categorized by a general chemical formula

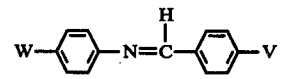

(benzalaniline), wherein V may be a dimethylamino radical or a nitro radical, and W may be dimethylaminophenylazo

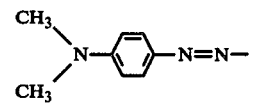

or dimethylaminophenylvinyl

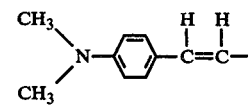

Thus, a first preferred yellow dye of the second series is 4-(4-dimethylaminophenylazo)-4'-dimethylaminobenzalaniline, having a chemical formula

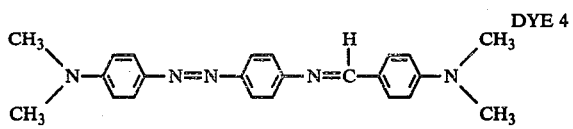

DYE 4 and the dichroic liquid crystal composition resulting when dye 4 is dissolved in a liquid crystal host has an order parameter of about 0.71 and a peak maximum absorption wavelength of about 415 nm. This dye is synthesized by dissolving equimolar quantities (0.01 M) of N,N-dimethyl-4,4'-azodianiline and p-dimethylaminobenzaldehyde in 300 cc. of benzene and refluxing at 80° C. on a steam bath for two hours and then filtering the hot reaction product and allowing a precipitate to separate out at 10° C. The precipitated product is then recrystallized from a mixture of benzene and hexane.

A second preferred yellow dichroic dye of the second series is 4-[2-(4-dimethylaminophenyl)vinyl]-4'-nitrobenzalaniline, having a chemical formula

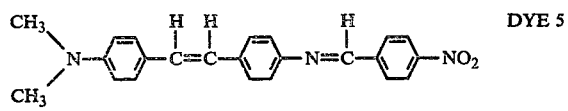

DYE 5 and the dichroic liquid crystal composition with dye 5 as guest has an order parameter of about 0.71 and a peak maximum absorption wavelength of about 450 nm.

All of the five preferred dichroic dyes have a yellow color and an order parameter S greater than 0.70 to provide a contrast ratio on the order of 10:1 in a liquid crystal display.

While the present invention has been described with reference to several preferred embodiments thereof, many variations and modifications will now be apparent to those skilled in the art. In particular, other liquid crystal materials such as the esters claimed in U.S. Pat. No. 3,984,344, issued Oct. 5, 1976, the biphenyl materials available from BDH Chemicals, the phenylcyclohexane materials (several of which are commercially available from Merck Co.,) and the like — may be equally advantageously utilized with the dyes hereinabove described to achieve similar magnitudes of order parameter S. It is our intent, therefore, to be limited not by the scope of the present disclosure herein, but only by the scope of the appended claims.

What is claimed is:

1. A dichroic liquid crystal composition for use in a liquid crystal display comprising:
   a host liquid crystal material having positive dielectric anisotropy; and
   a guest dichroic dye dissolved in said liquid crystal material, said dichroic dye being selected from the group consisting of

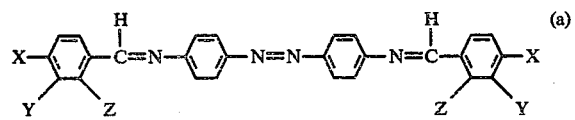

(a)

wherein X is one of a hydrogen atom, a nitro ($NO_2$) radical and a dimethylamino ($N(CH_3)_2$) radical, and the Y and Z bonds couple to the one of (1) a pair of hydrogen atoms, if X is other than a hydrogen atom, and (2) a fused benzene ring; and

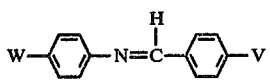

(b)

wherein V is one of a nitro ($NO_2$) radical and a dimethylamino ($N(CH_3)_2$) radical, and W is one of a dimethylaminophenylazo

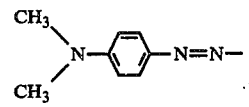

radical and a dimethylaminophenylvinyl

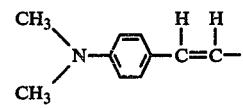

radical;

said dichroic liquid crystal composition having an order parameter S of at least 0.70 and a peak absorption wavelength between about 410 nanometers and about 450 nanometers, wherein said host liquid crystal material consists essentially of about 70%, by weight, of p-pentylphenyl-2-chloro-4-(p-pentylbenzoyloxy)benzoate and about 30%, by weight, of an ester mixture composed approximately of 50-60% by weight of 4'-n-pentylphenyl ester of anisic acid, 25-35% by weight of 4'-n-pentylphenyl ester of 4-hexyloxy-benzoic acid, and 10-15% by weight of (2-cyano-4'-butylphenyl) ester of 4-(hexanoyloxybenzoyloxy)-benzoic acid.

2. The dichroic liquid crystal composition of claim 1, wherein the guest dichroic dye is 4,4'-bis(4-dimethylaminobenzalamino)azobenzene, having a chemical formula

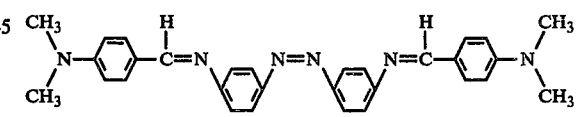

the composition being characterized by an order parameter of about 0.77 and a peak absorption wavelength of about 424 nm.

3. The dichroic liquid crystal composition of claim 1, wherein the guest dichroic dye is 4,4'-bis(4-nitrobenzalamino)azobenzene having a chemical formula

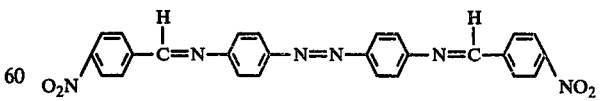

the composition being characterized by an order parameter of about 0.75 and a peak absorption wavelength of about 415 nm.

4. The dichroic liquid crystal composition of claim 1, wherein the guest dichroic dye is 4,4'-bis(1-naphthylamino)azobenzene having a chemical formula

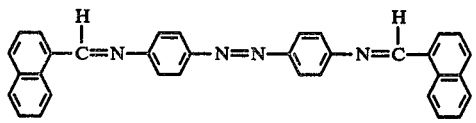

the composition being characterized by an order parameter of about 0.75 and a peak absorption wavelength of about 410 nm.

5. The dichroic liquid crystal composition of claim 1, wherein the guest dichroic dye is 4-(4-dimethylaminophenylazo)-4'-di-methylamino-benzalaniline having a chemical formula

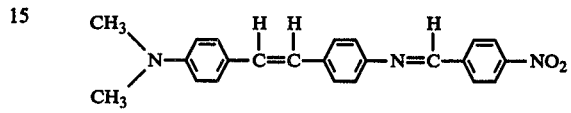

the composition being characterized by an order parameter of about 0.71 and a peak absorption wavelength of about 415 nm.

6. The dichroic liquid crystal composition of claim 1, wherein the guest dichroic dye is 4-[2-(4-dimethylaminophenyl)vinyl]-4'-nitrobenzalaniline having a chemical formula the composition being characterized by an order parameter of about 0.71 and a peak absorption wavelength of about 450 nm.

* * * * *